(12) United States Patent
Ferchau

(10) Patent No.: US 7,353,073 B2
(45) Date of Patent: *Apr. 1, 2008

(54) METHOD FOR MANAGING APPLIANCES

(75) Inventor: Joerg Ferchau, Morgan Hill, CA (US)

(73) Assignee: Sandisk Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/292,130

(22) Filed: Dec. 1, 2005

(65) Prior Publication Data

US 2007/0129812 A1   Jun. 7, 2007

(51) Int. Cl.
*G06F 19/00* (2006.01)

(52) U.S. Cl. .................... 700/108; 711/115

(58) Field of Classification Search ........... 700/108; 717/168, 171–173; 710/100; 711/104, 115
See application file for complete search history.

(56) References Cited

U.S. PATENT DOCUMENTS

| | | | |
|---|---|---|---|
| 5,570,315 A | 10/1996 | Tanaka et al. | |
| 5,581,464 A | 12/1996 | Woll et al. | |
| 5,616,894 A | 4/1997 | Nieminen et al. | |
| 5,774,397 A | 6/1998 | Endoh et al. | |
| 5,926,365 A | 7/1999 | Roelofs et al. | |
| 5,967,021 A | 10/1999 | Yung | |
| 6,046,935 A | 4/2000 | Takeuchi et al. | |
| 6,311,101 B1 | 10/2001 | Kastner | |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,643,188 B2 | 11/2003 | Tanaka et al. | |
| 6,771,536 B2 | 8/2004 | Li et al. | |
| 6,781,877 B2 | 8/2004 | Cernea et al. | |
| 6,915,343 B1 | 7/2005 | Brewer et al. | |
| 7,110,836 B2 * | 9/2006 | Sturm et al. | ................... 700/83 |
| 2002/0066095 A1 * | 5/2002 | Yu | .................. 717/173 |
| 2003/0101325 A1 | 5/2003 | Desoli et al. | |
| 2003/0147278 A1 | 8/2003 | Tanaka et al. | |
| 2004/0083471 A1 * | 4/2004 | Nam et al. | ................... 717/168 |
| 2005/0031100 A1 * | 2/2005 | Iggulden et al. | ........ 379/102.03 |
| 2005/0043868 A1 | 2/2005 | Mitcham | |

(Continued)

FOREIGN PATENT DOCUMENTS

EP   1162524   12/2001

(Continued)

OTHER PUBLICATIONS

"U3 Smart Drive Computing Platform", (Jun. 2005).

(Continued)

*Primary Examiner*—Alexander Kosowski
(74) *Attorney, Agent, or Firm*—Klein, O'Neill & Singh, LLP; Tejinder Singh

(57) ABSTRACT

A method for maintaining and/or repairing an appliance is provided. The appliance includes collecting data from the appliance, wherein a flash device collects information from the appliance; launching an application from the flash device after the flash device interfaces with a computing system, wherein the application provides a user interface with selectable options for maintaining and/or repairing the appliance; contacting a server, wherein the computing system has access to a network connection and connects to the server; and transmitting the collected information from the flash device to the server.

17 Claims, 7 Drawing Sheets

U.S. PATENT DOCUMENTS

| | | | |
|---|---|---|---|
| 2005/0075938 A1* | 4/2005 | Mukai et al. | 705/24 |
| 2005/0090942 A1 | 4/2005 | Shi | |
| 2005/0096760 A1 | 5/2005 | Sturm et al. | |
| 2005/0097541 A1* | 5/2005 | Holland | 717/168 |
| 2005/0109841 A1* | 5/2005 | Ryan et al. | 235/380 |
| 2005/0198563 A1* | 9/2005 | Kristjansson | 715/507 |
| 2006/0130004 A1* | 6/2006 | Hughes et al. | 717/131 |
| 2006/0288166 A1* | 12/2006 | Smith et al. | 711/115 |

FOREIGN PATENT DOCUMENTS

| | | |
|---|---|---|
| EP | 1338935 | 8/2003 |
| EP | 1724093 | 11/2006 |
| WO | WO-90/03724 | 4/1990 |
| WO | WO-2005/084916 | 9/2005 |

OTHER PUBLICATIONS

International Search Report on corresponding PCT application from International Searching Authority (EPO) dated Oct. 5, 2007.

Written Opinion on corresponding PCT application from International Searching Authority (EPO) dated Oct. 5, 2007.

\* cited by examiner

METHOD FOR MANAGING APPLIANCES

CROSS REFERENCE TO RELATED APPLICATION

This patent application is related to patent application Ser. No. 11/292,132, entitled "SYSTEM FOR MANAGING APPLIANCES", filed on even date herewith, the disclosure of which is incorporated herein by reference in its entirety.

FIELD OF THE INVENTION

The present invention relates to computing systems, and more particularly, to managing devices, appliances, or equipment (jointly referred to herein as "appliance" or "appliances") using applications stored and launched from flash memory devices.

BACKGROUND

Various legacy type devices/equipment/appliances, for example, automobiles, digital cameras, and other type of devices (jointly referred to herein as "appliances" or "appliance" throughout this specification) are commonly used for personal and business purposes. Some of these appliances have a built in computing system (including a processor, application specific integrated circuits (ASICs) and others) that control appliance operation and collect appliance related information, including error codes, operating environment parameters and other information. The computer code (or firmware) for the appliance often needs to be upgraded/changed. Additionally, access to diagnostic information on the appliance may be required in order to perform diagnostics, maintenance or troubleshooting operations.

Conventional processes to repair/inspect/diagnose/troubleshoot appliances are cumbersome and tedious. The consumer often has to make an appointment with a repair shop/dealer to get the appliance diagnosed. The appliance is then taken to a repair depot or a technician comes to the appliance to diagnose a problem or for routine maintenance. Once the problem is diagnosed (or the appliance inspected, used interchangeably throughout this specification), repair parts are ordered and then the appliance is repaired/serviced. This process is labor intensive and can cause delays in ordering parts/maintaining these appliances.

Conventional processes to upgrade the firmware of these appliances are also inefficient. Often one has to take these appliances to authorized dealerships/repair depots to upgrade appliance firmware/software (or a technician has to visit the appliance and upgrade the firmware/software).

Therefore, there is a need for a method and system to manage these appliances efficiently.

SUMMARY OF THE INVENTION

In one aspect of the present invention, a system for maintaining and/or repairing an appliance is provided. The system includes, a flash device that collects information from the appliance and stores an application for processing the collected information; and a computing system that interfaces with the flash device to receive the collected information from the flash device, wherein the application is launched from the flash device after the flash device interfaces with the computing system and the application provides a user interface with selectable options for maintaining and/or repairing the appliance.

In another aspect of the present invention, a flash device that can interface with an appliance is provided. The flash device includes a memory controller and non-volatile memory cells, wherein the flash device collects information from the appliance and stores an application for processing the collected information; and interfaces with a computing system that receives the collected information from the flash device, wherein the application is launched from the flash device after the flash device interfaces with the computing system and the application provides a user interface with selectable options for maintaining and/or repairing the appliance; wherein the flash device automatically selects options for the user based on the collected information, or user selectable options are presented via a network system to the user on the computing system.

In another aspect of the present invention, an appliance is provided. The appliance includes, an interface that allows information transfer between the appliance and a flash device, wherein the flash device collects information from the appliance and stores an application for processing the collected information and a computing system interfaces with the flash device to receive the collected information from the flash device; wherein the application is launched from the flash device after the flash device interfaces with the computing system and the application provides a user interface with selectable options for maintaining and/or repairing the appliance.

In yet another aspect of the present invention, a method for maintaining and/or repairing an appliance is provided. The method includes collecting data from the appliance, wherein a flash device collects information from the appliance; launching an application from the flash device after the flash device interfaces with a computing system, wherein the application provides a user interface with selectable options for maintaining and/or repairing the appliance; contacting a server, wherein the computing system has access to a network connection and connects to the server; and transmitting the collected information from the flash device to the server.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, a non-volatile, flash memory device (may also be referred to as "flash device" or "flash memory" throughout this specification) is provided that is used to collect appliance related information/data from plural and different type of appliances (for example, automobiles, appliances, electronic goods like digital cameras, and any other type of equipment/device that can be coupled to a flash memory device). The flash device interfaces with a computing system that connects to a server. The server connection is triggered by an application that is loaded from the flash device.

The collected data including diagnostic information is uploaded to the remote server. Based on the collected data and/or user interaction, different types of tasks are initiated. Some of these tasks include ordering parts, scheduling appointments, finding local expertise to repair an appliance and other tasks. The server can also download codes/firmware upgrades to the flash device, which is used to update the firmware (or software of the appliance, or to reset the appliance or its diagnostic codes.

Furthermore, based on the collected data, the storage device can also decide what data/information to present to the user. For example, the storage device could present an owner's manual or portions of an owner's manual based on the collected data.

To facilitate an understanding of the preferred embodiment, the general architecture of the overall system and a computing system/non-volatile memory storage device will first be described. The specific architecture and operation of the preferred embodiment will then be described with reference to the general architecture.

Overall System

Figure 1A:
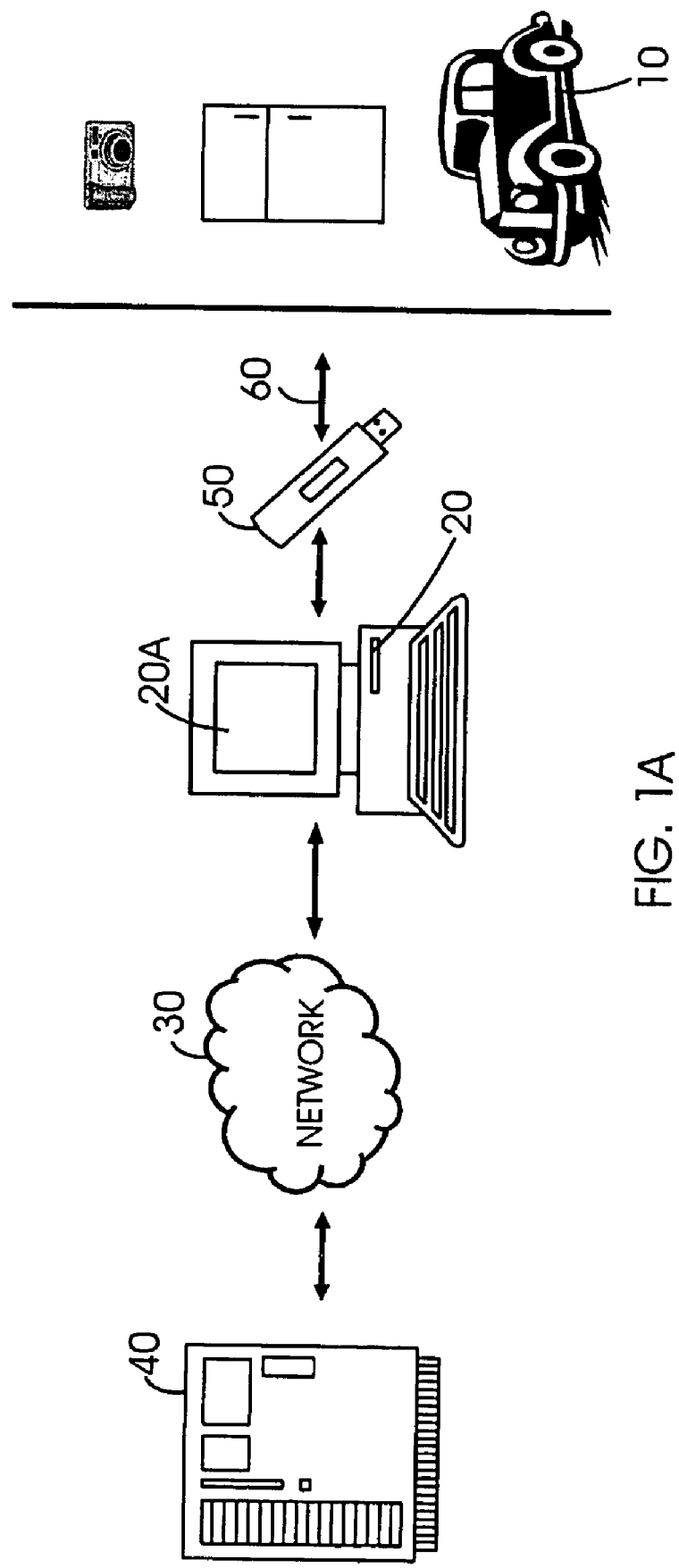
FIG. 1A shows a block diagram of an overall system for collecting/processing appliance related information.

FIG. 1A shows a top-level block diagram of a system for collecting information regarding a legacy type appliance 10 and managing the information to maintain/repair appliance 10. As shown in FIG. 1A, appliance 10 can be an automobile, digital camera, an appliance (refrigerator) or any other equipment that can interface with a flash device 50. In one aspect, appliance 10 includes a universal serial bus (USB) connector (or any other standard/proprietary interface) to connect flash memory 50. It is noteworthy that the adaptive aspects of the present invention are not limited to any particular type of interface.

Flash memory 50 stores an application that can collect appliance 10 information. For example, flash memory 50 collects diagnostic/repair data, error codes if any, overall appliance 10 related environment data, appliance 10 related codes or any other data that is useful in maintaining/repairing/servicing appliance 10 (collectively shown as data 60).

In one aspect, flash device 50 is portable and can be removed from appliance 10 to interface with computing system 20 after it collects data 60. It is noteworthy that flash device 50 can be physically connected to computing system 20 via a USB connector (or any other interface) or provide data 60 to computing system 20 via wireless, Bluetooth, optical or using other non-contact techniques.

When flash device 50 is connected (or interfaces) to computing system 20, an appropriate user interface is launched based on an application stored in flash device 50. This user interface is shown on a display device (for example, monitor 20A) and includes appropriate forms, graphical information, video/audio messages, websites or other network resources via a network 30/remote server 40. The user interface is provided based on data 60.

In one aspect, flash device 50 can decipher certain codes collected from appliance 10 and based on that a computer (for example, server 40) with a particular Internet Protocol (IP) address is contacted. Based on the collected data, flash device 50 can also decide what data/information to present to the user. For example, the storage device could present an owner's manual or portions of an owner's manual based on the collected.

In one aspect, if the user interface provides a certain form, then the form can be automatically filled-in based on data 60. Information that is automatically filled in includes, without limitation, passwords, serial numbers (for example, a vehicle VIN number), user name, dates, authentication information, if any, or any other type of information. The information from the form is sent to server 40 and appropriate action is taken, as described below.

In another aspect, based on data 60, the user interface provides the user with local resources, for example, local repair shops/dealers or any other entity that can assist the user to properly service/maintain appliance 10. In one aspect, the user interface provides the user with a web site of a resource that can assist in solving (or for preventive maintenance) problems that can be diagnosed based on data 60.

In another aspect, the user interface also provides a link to a dealer/repair shop website or to any other website/network means so that the user can automatically schedule an appointment for maintenance/repair.

The user interface also provides a part ordering option either via server 40 or any other entity, based on data 60. Hence, based on the collected data, a user can find a local resource, schedule an appointment and order parts for appliance 10.

Once the forms are filled or otherwise, server 40 is contacted via network 30 (for example, the Internet). Server 40 receives form information or any other information from data 60; based on which server 40 can perform certain tasks, for example, provide reset codes, system/firmware updates or any other task that assists in maintaining/servicing.

In another aspect, server 40 provides the user with the local resources, user interface to schedule an appointment and/or order parts.

Computing system 20 provides data, information, instructions or updates to flash device 50 from server 40. Flash device 50 receives the updates and then internally processes the new information/data (using the appliance application stored in flash device 50). The information can then be uploaded to appliance 10. The updates can include firmware upgrades; reset instructions, operating parameter adjustments or other such information or instructions.

When flash device 50 is updated either locally or from a remote server, all or part of the data is displayed on a display device attached to the computing system interfacing with flash device 50.

It is noteworthy that the present invention is not limited to any particular type of computing system 20. For example, desktop type, notebook or laptop computers, handheld devices, set-top boxes or any other system capable of running computer-executable process steps, as described below, may be used to implement the various aspects of the present invention.

Computing System/Flash Memory

Figure 1B:
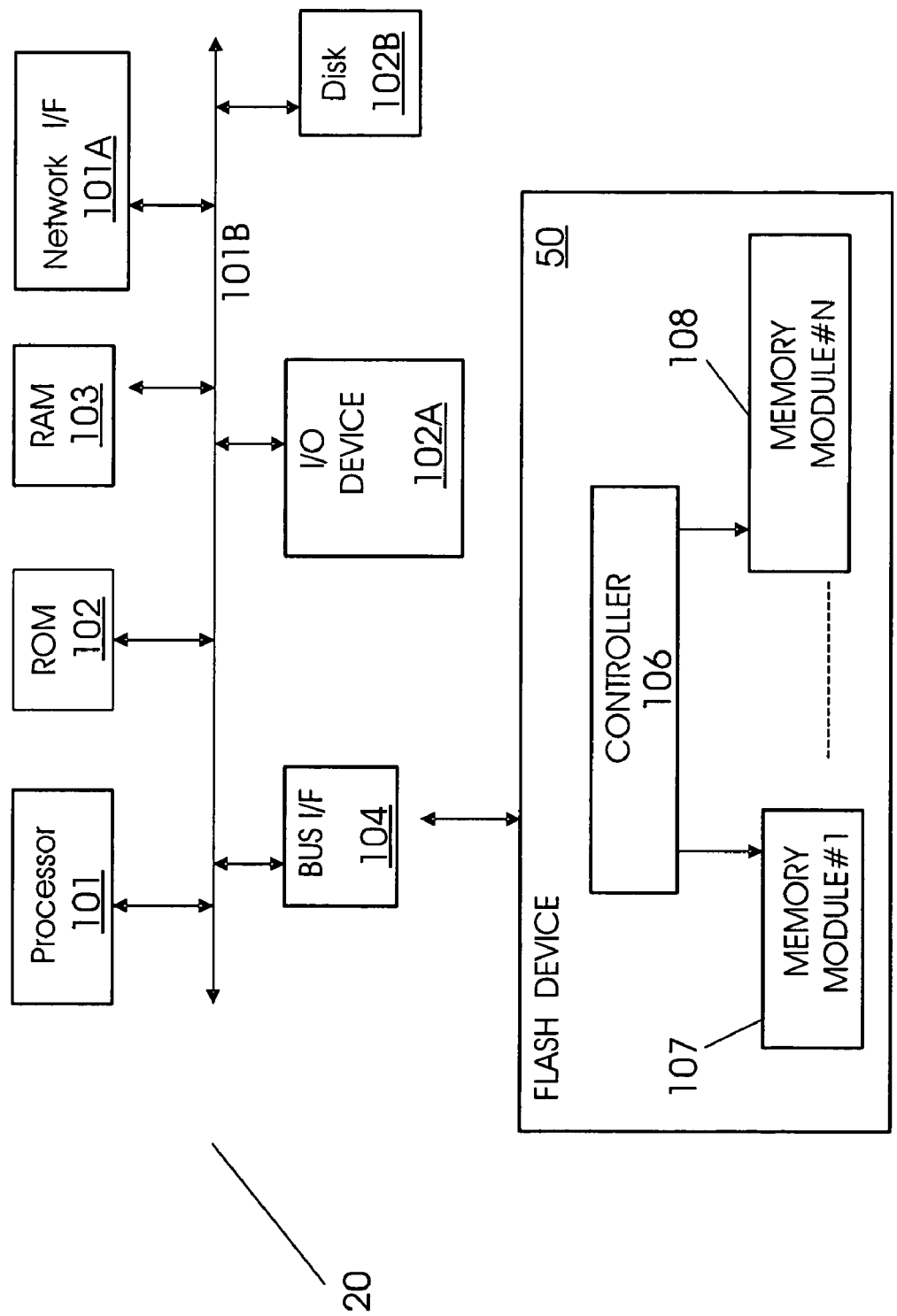
FIG. 1B shows a block diagram of the internal architecture of a computing system in FIG. 1A

FIG. 1B shows a block diagram of computing system (may also be referred to as a "host system", "computer" or "host") 20 that includes a central processing unit ("CPU") (or microprocessor) 101 connected to a system bus 101B. Random access main memory ("RAM") 103 is coupled to system bus 101B and provides CPU 101 with access to memory storage. When executing program instructions, CPU 101 stores those process steps in RAM 103 and executes the stored process steps out of RAM 103.

Host system 20 connects to a computer network 30 via network interface 101A. Host system 20 typically uses a modem, an integrated services digital network (ISDN) connection, or the like to connect with network 30. The network connection allows host system 20 to download data files, firmware code for appliance 10 or any other type of information.

Read only memory ("ROM") 102 is provided to store invariant instruction sequences such as start-up instruction sequences or basic Input/output operating system (BIOS) sequences.

Input/Output ("I/O") devices, for example, a keyboard, a pointing device ("mouse"), a monitor (for example, 20A), a modem and the like are also provided (not shown) and are coupled via I/O devices interface 102A. It is noteworthy that I/O device interface 102A can have more than one interface to couple the different types of I/O devices.

Host system 20 may also include a computer-readable memory medium such as a hard disk 102B for storing readable data. Besides other programs, disk 102B can store application programs including web browsers by which host system 20 connects to the Internet. It is noteworthy that computing system 20 does not need to store application programs that are used to parse/interpret data collected from appliance 10. As described below, such application programs are stored in flash memory 50.

It is noteworthy that the host system 20 configuration and system architecture can vary and the present invention is not limited to any particular type of configuration/architecture. For example, host system 20 may be a kiosk type terminal that can connect to the Internet and does not have significant computing capabilities. In another case, host system 20 may be a desktop/notebook computer or any other types of computing system.

Host system 10 is coupled to a flash memory device 50 that includes a controller module 106 (may also be referred to as "memory controller" or "controller") and solid-state memory modules 107-108 (shown as Memory Module #1 and Memory Module #N). Controller module 106 interfaces with host system 10 via a bus interface 104 or directly via system bus 101B or another peripheral bus (not shown).

There are currently many different flash memory cards/devices that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications (for example, The Universal Serial Bus (USB) specification, incorporated herein by reference in its entirety), the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 1C:
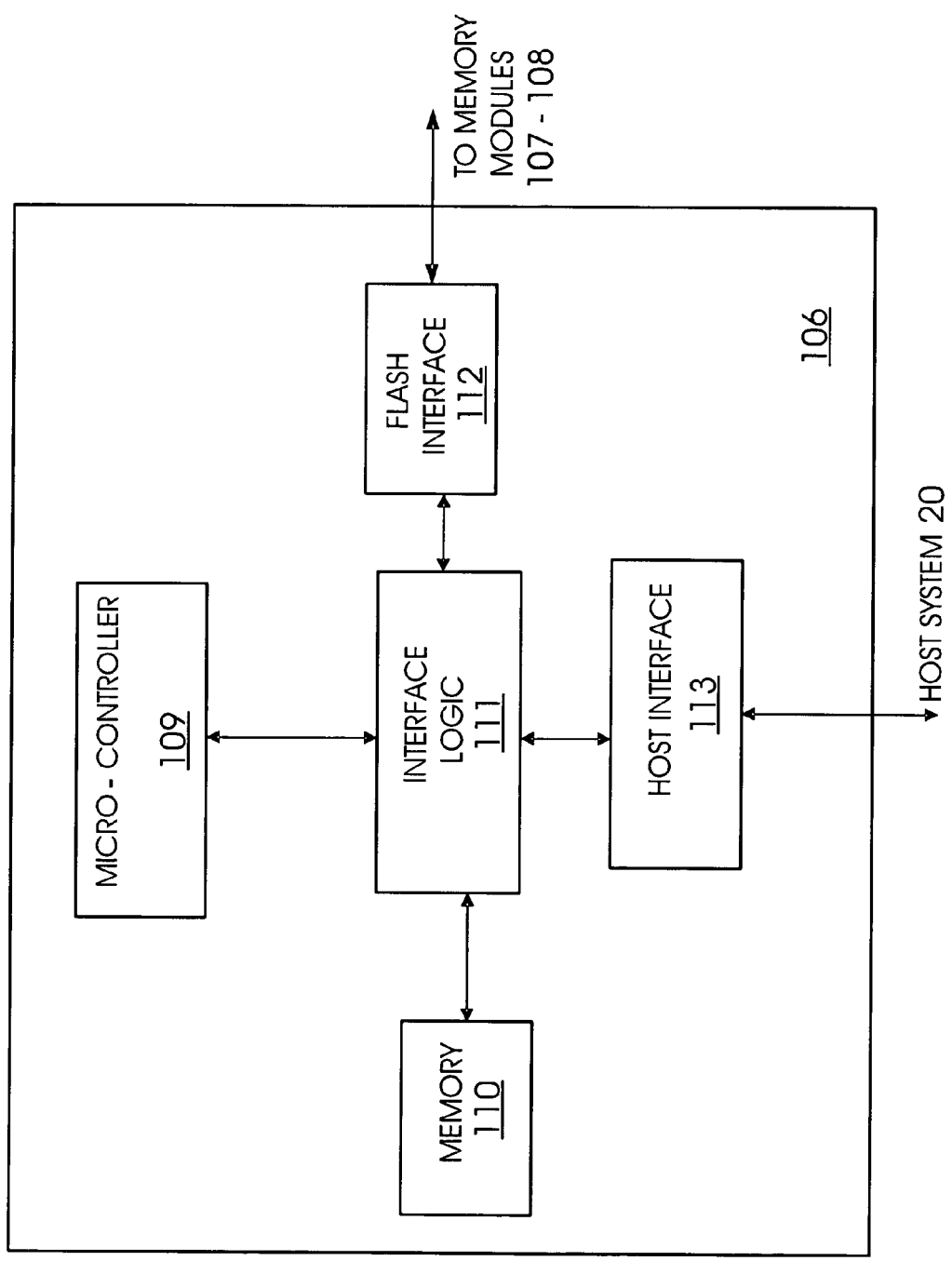
FIG. 1C shows a block diagram of a memory controller for a flash memory device, used according to one aspect of the present invention.

FIG. 1C shows a block diagram of the internal architecture of controller module 106. Controller module 106 includes a microcontroller 109 that interfaces with various other components via interface logic 111. Memory 110 stores firmware and software instructions that are used by microcontroller 109 to control the operation of flash device 50. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 20, while a flash interface 112 interfaces with memory modules 107-108.

Internet

The process steps, according to one aspect of the present invention may be performed using the Internet. The following provides a brief description of the Internet.

The Internet connects plural computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language (XML) as published by W3C Consortium, Version 1, Second Edition, October 2000, ©W3C may also be used. The collection of all such publicly available computer files is known as the World Wide Web (WWW).

The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network or an Internet Service Provider. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Appliance 10

Figure 1D:
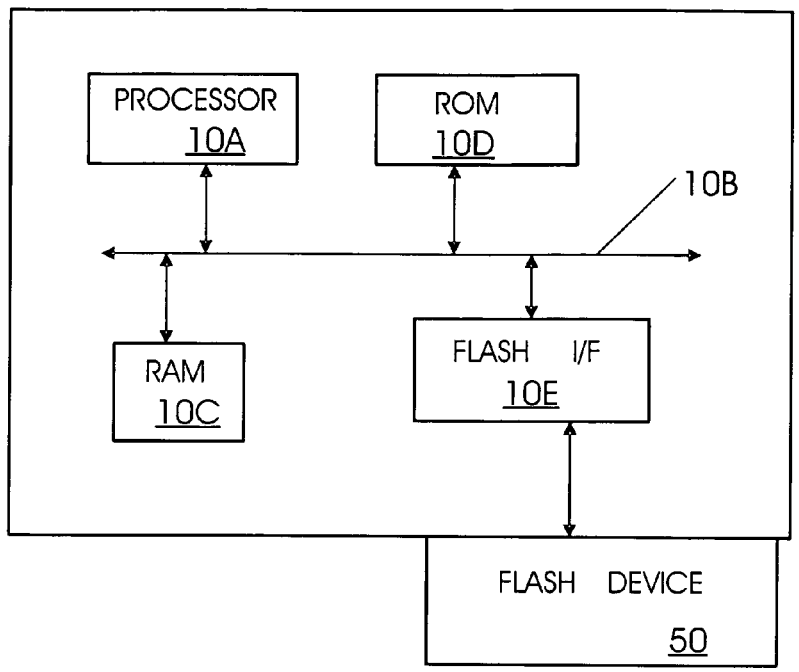
FIG. 1D shows a top-level block diagram of an appliance, used according to one aspect of the present invention.

FIG. 1D shows a top-level generalized block diagram of an appliance 10 that is coupled to flash memory 50. Appliance 10 includes a processor 10A (which includes a state machine, specialized hardware, ASIC) coupled to a local bus 10B. Appliance 10 includes an interface 10E that is coupled to flash memory 50. Interface 10E includes a receptacle/connector, for example, a USB connector.

Processor 10A has access to RAM 10C for executing firmware code or any other code. Processor 10A can also access ROM 10D to execute invariant instruction sequences such as start-up instruction sequences or basic Input/Output operating system (BIOS) sequences.

Figure 2C:
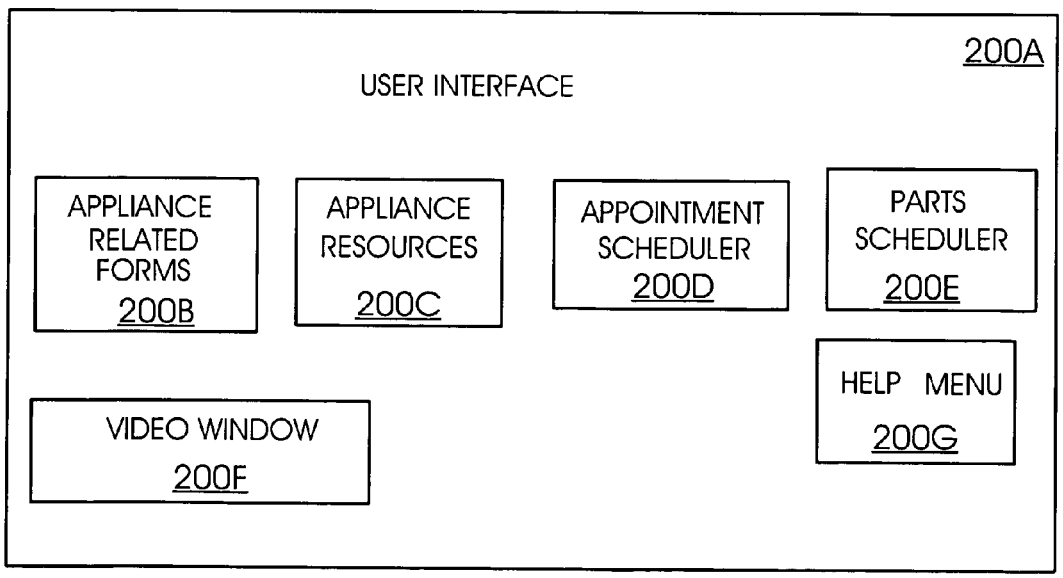
FIG. 2C shows a block diagram of a user interface, according to one aspect of the present invention.
Figure 2A:
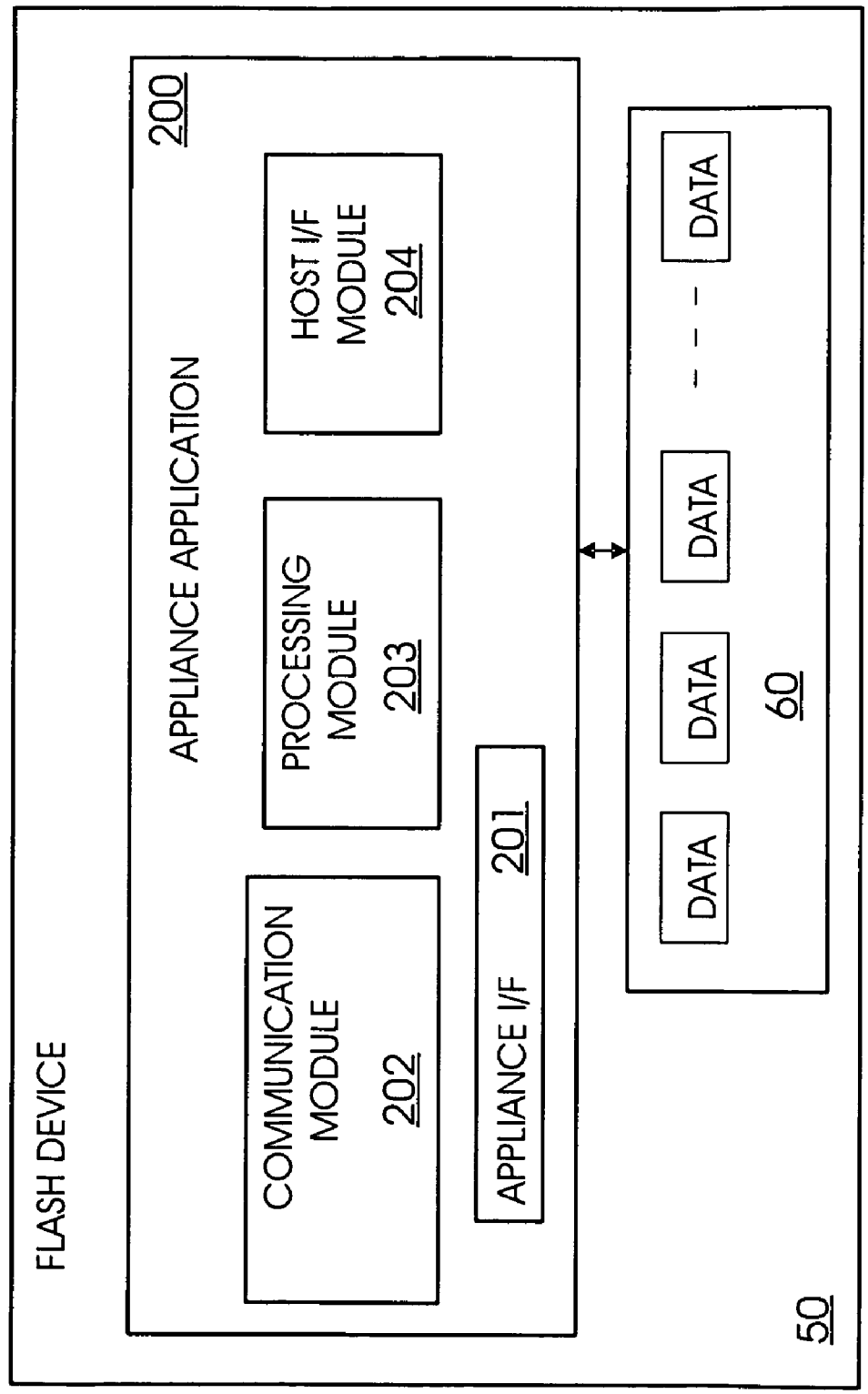
FIG. 2A shows a top-level block diagram of an Appliance Application, according to one aspect of the present invention.

FIG. 2A shows a top-level block diagram of an appliance application 200 that is stored in flash device 50. Application 200 comprises of appliance interface module 201 that collects data 60 and stores it in flash memory cells 107-108.

Application 200 also includes a host interface module 204 that allows flash device to provide stored data 60 to computing system 20.

Communication module 202 includes interfaces that communicate with appliance 10's computing or diagnostic system and includes any special codes, commands, syntax, or protocols. Communication module 202 communicates with application 10 to send or receive data.

Processing module 203 processes information that is received from appliance 10 and formats the data so that it can be presented to a user (via computing system 20). Processing module 203 also processes information (for example, upgrades) that are received from server 40.

Server Application

Figure 2B:
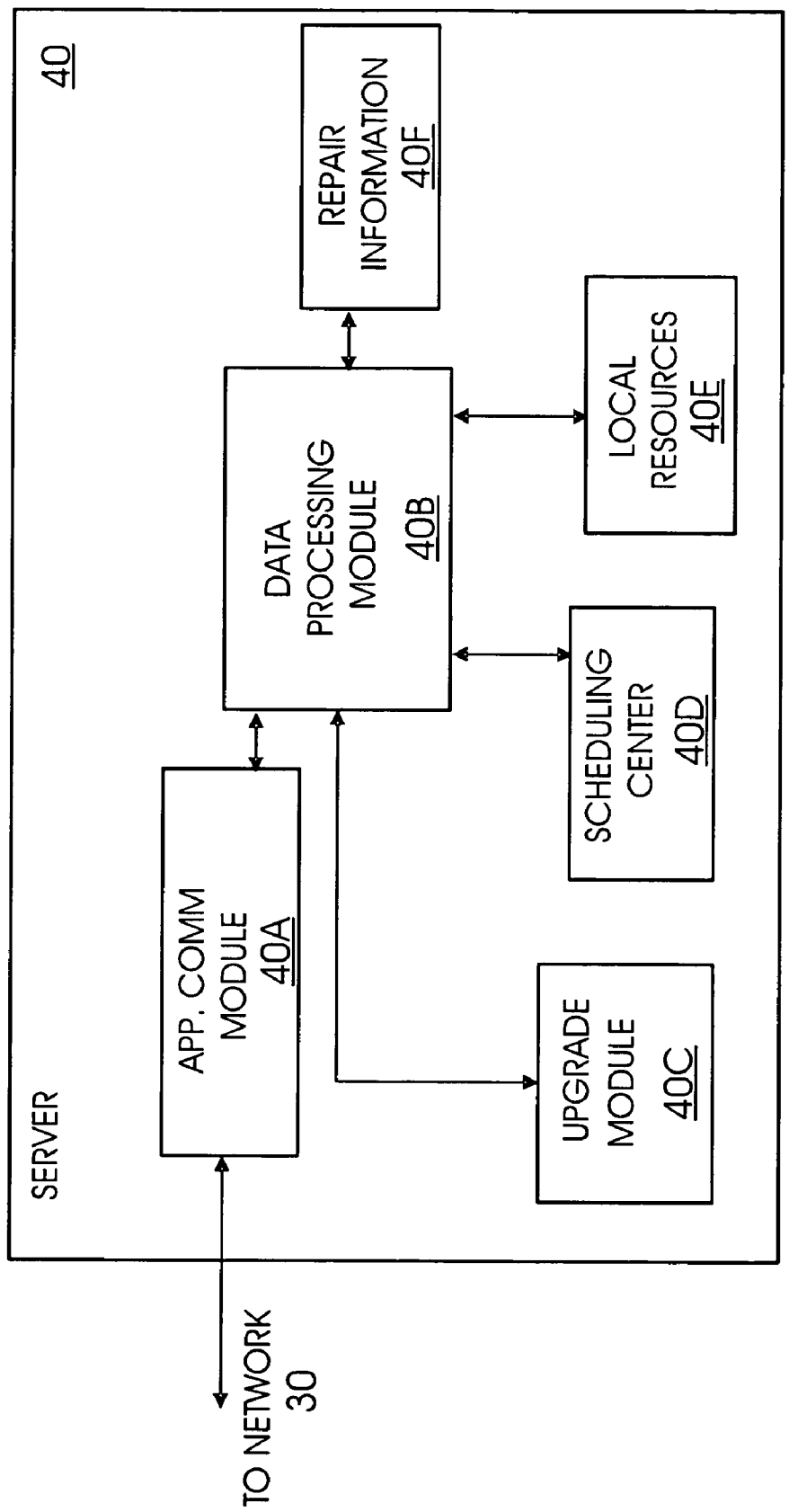
FIG. 2B shows a block diagram of a server application/architecture, according to one aspect of the present invention.

FIG. 2B shows a top-level functional block diagram of server 40. The plural components may be integrated into a single application or operate as individual functional blocks.

Server 40 communicates with computing system 20/flash device 50 via device communication module 40A. Communication module 40A receives data 60 or information that is provided via a user interface (described below with respect to FIG. 2C). Information received from an application is processed by a data processing module 40B.

Data processing module 40B is linked to a local resources module 40E. Local resources module 40E can provide a list of repair shops/dealers/technician information to a user based on the information received by server 40.

Scheduling center 40D allows real time scheduling option to a user based again on the information transferred to server 40.

Data processing module also interfaces with a repair information module 40F that is used to provide repair related information (audio, video or text files) to a user. Data processing module 40B packages the relevant information based on the information it receives from flash device 50 and/or user input. The information is then sent to flash device 50 via network 30 and/or displayed to the user.

Data processing module 40B also interfaces with upgrade module 40C that can provide upgrades to appliance 10 firmware, reset codes, diagnostic system upgrades or other information based on the information that is transmitted from flash device 50 to server 40.

User Interface

FIG. 2C shows a top-level block diagram of a user interface that is displayed on a display device, for example, monitor 200A. User interface 200A can have various features and can be presented in plural ways.

User interface 200A provides forms 200B that are used to aggregate/compile appliance 10 related information. In one aspect, forms 200B can be auto-filled based on data 60 and/or a user can enter information. Form 200B layout/content can vary based on the type of appliance and the type of information that is collected. For example, specific type of forms can be displayed if a specific problem is detected based on collected data 60. The forms can be used to simply extract data 60 or collect additional information from the user that can aid in repairing/servicing the appliance.

User interface 200A also provides the user with links to appliance resources 200C. The resources can be filtered based on data 60. The resources include, without limitation, information (for example, websites) regarding repair shops, dealers, technician information, device related websites or others.

Based on data 60 and using appointment scheduler 200D, the user is given an option to schedule an appointment with a repair/service entity. In one aspect, the appointment is synchronized with server 40 (using scheduling center 40D).

User interface 200A also provides the user an option to order parts (when needed) using parts scheduler 200E. Parts scheduler is integrated with a dealer/server 40 or any other entity. Application 200 recommends parts replacement/upgrades based on collected data 60.

A video window 200F is also provided that can show videos (for example, self help instructions) that are streamed from server 40. The type of video and instructions are again based on data 60.

A help menu 200G is also provided via user interface 200A. The help menu 200G can be searchable or is customized based on collected data 60. This allows the user to review information that is relevant to the diagnostic data that is collected by flash device 50. Server 40 can stream help information based on collected data 60.

Figure 3:
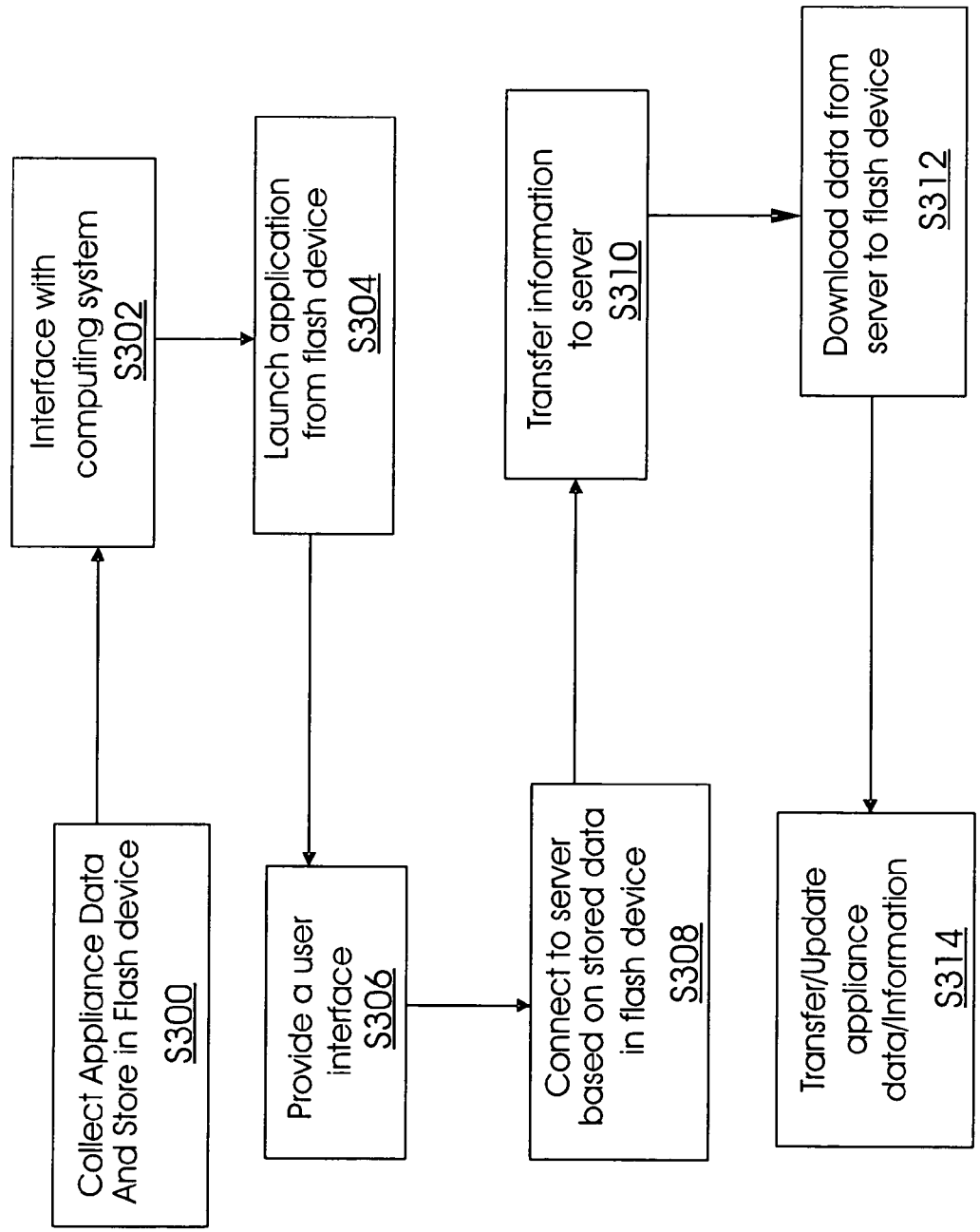
FIG. 3 shows a process flow diagram for collecting/processing appliance information, according to one aspect of the present invention.

Process Flow:

FIG. 3 shows a process flow diagram for collecting diagnostic information from appliance 10, using user interface 200A, processing data 60 and updating appliance 10 information, according to one aspect of the present invention.

Turning in detail to FIG. 3, in step S300, flash device 50 collects information 60 from appliance 10. Information 60 includes diagnostic data, error codes, environment related information and any other data. An embedded system in appliance 10 downloads information 60 to flash device 50 and it is stored in memory cells 107-108.

After data is collected, in step S302, flash device 50 interfaces with computing system 20 that has access to network 30. As stated above, flash device 50 can be coupled to computing system using a standard/proprietary interface or can transfer information via a wireless connection.

Once flash device 50 interfaces with computing system 20, in step S304, an appliance application (for example 200) is launched. The application can be launched by processor 101 after copying an executable file into RAM 103.

In another aspect, flash device 50 assists in launching application 200 using controller module 106. In one aspect, the U3 standard specification published by the U3 Consortium facilitates flash device 50 to launch application 200. The U3 specification that is available from the website U3.com, is incorporated herein by reference in its entirety.

In step S306, a user interface (for example, user interface 200A (described above with respect to FIG. 2C) is provided to the user. The user interface allows a user to perform various tasks, as described above, for example, schedule an appointment, order parts and others. Pre-filled, appliance related forms are also provided.

In step S308, a connection to server 40 is established via network 30.

In step S310, pre-filled forms, data 60, and/or user input is provided to server 40. Server 40 analyzes all the information it receives via the user interface and from flash device 50. Based on the information, in step S312, server 40 downloads upgrades, including diagnostic reset codes, firmware updates and or any other information to flash device 50.

In step S314, flash device 50 processes the received information and transfers the information to appliance 10. Appliance 10 firmware, operating parameters and operational codes can hence be upgraded.

In one aspect of the present invention, computing system 20 does not need to have appliance 10 specific application/software. Flash device 50 stores application 200 and the associated data.

In another aspect of the present invention, a user does not have to take appliance 10 to a repair shop or have a technician visit appliance 10 for appliance diagnosis. Instead, the user can collect data and communicate with a remote server.

In yet another aspect, a user can schedule a maintenance/repair appointment based on the collected data and/or order parts, if needed. Delay is minimized and the process is efficient.

In yet another aspect of the present invention, appliance 10 can use upgraded codes/firmware without taking appliance 10 to a repair shop.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for maintaining and repairing an appliance, comprising:
   collecting information from the appliance, wherein a flash device collects information from the appliance and based on the collected information, the flash device determines what information is to be presented to a user;
   launching an application stored in the flash device after the flash device interfaces with a computing system, wherein the flash device assists in launching the application and the application provides a user interface with selectable options for maintaining and repairing the appliance;
   contacting a server, wherein the computing system has access to a network connection and connects to the server;
   transmitting the collected information from the flash device to the server; and
   upgrading appliance related information, wherein the server upgrades the appliance related information based on the collected information and the upgraded appliance related information is used to maintain and repair the appliance.

2. The method of claim 1, wherein based on the collected information, the user interface provides an option to the user to schedule an appointment with a resource associated with the appliance and the appointment is scheduled to maintain and repair the appliance.

3. The method of claim 2, wherein the resource associated with the appliance is one or more of an appliance dealership, repair facility and a technician.

4. The method of claim 1, wherein based on the collected information, the user interface provides a form to the user and the form is automatically filled, completely or partially, and information from the form is sent to the server; wherein the form is used to extract the collected information and to collect any additional information regarding the appliance, and the collected information and the additional information is used to maintain and repair the appliance.

5. The method of claim 1, wherein based on the collected information, the user interface provides the user with a link to a website of a resource to assist the user to maintain and repair the appliance.

6. The method of claim 1, wherein the appliance is one or more of an automobile, a digital camera, and industrial equipment.

7. The method of claim 2, wherein based on the collected information the server sends updates to the flash device and the updates are used for maintaining and repairing the appliance.

8. The method of claim 7, wherein the updates include one or more of appliance firmware updates, user instructions, reset codes and appliance system updates.

9. The method of claim 1, wherein based on the collected information, the flash device automatically selects options for the user.

10. A method comprising:
    collecting information from an appliance, wherein a non-volatile memory device with a memory controller collects information from the appliance and based on the collected information determines what information is to be presented to a user;
    launching an application stored in the non-volatile memory device after the non-volatile memory device interfaces with a computing system, wherein the memory controller assists in launching the application and the application provides a user interface with selectable options for maintaining and repairing the appliance;
    connecting to a server, wherein the computing system connects to the server via a network connection;
    transmitting the collected information from the non-volatile memory device to the server;
    upgrading appliance related information, wherein the server upgrades the appliance related information based on the collected information; and
    sending upgraded appliance related information to the non-volatile memory device, wherein the upgraded appliance related information is transferred to the appliance and used for maintaining and repairing the appliance.

11. The method of claim 10, wherein based on the collected information, the user interface provides an option to the user to schedule an appointment with a resource associated with the appliance to maintain and repair the appliance.

12. The method of claim 10, wherein based on the collected information, the user interface provides a form to the user and the form is automatically filled, completely or partially, and information from the form is sent to the server; wherein the form is used to extract the collected information and to collect any additional information regarding the appliance and the collected information and the additional information is then used to maintain and repair the appliance.

13. The method of claim 10, wherein based on the collected information, the user interface provides the user with a link to a website of a resource, to assist the user to maintain and repair the appliance.

14. The method of claim 10, wherein the appliance is one or more of an automobile, a digital camera and industrial equipment.

15. The method of claim 10, wherein based on the collected information the server sends updates to the non-volatile memory device.

16. The method of claim 15, wherein the updates include one or more of appliance firmware updates, user instructions, reset codes and appliance system updates.

17. The method of claim 10, wherein based on the collected information, the non-volatile memory device automatically selects options for the user for maintaining and repairing the appliance.

* * * * *